(12) United States Patent
Tusch

(10) Patent No.: US 9,947,297 B2
(45) Date of Patent: Apr. 17, 2018

(54) METHOD AND APPARATUS FOR CONTROLLING A DISPLAY

(71) Applicant: Apical Ltd., London (GB)

(72) Inventor: Michael Tusch, London (GB)

(73) Assignee: Apical Ltd., London (GB)

( * ) Notice: Subject to any disclaimer, the term of this patent is extended or adjusted under 35 U.S.C. 154(b) by 0 days.

(21) Appl. No.: 14/709,698

(22) Filed: May 12, 2015

(65) Prior Publication Data

US 2015/0325208 A1    Nov. 12, 2015

(30) Foreign Application Priority Data

May 12, 2014    (GB) .................................. 1408358.8

(51) Int. Cl.
| | | |
|---|---|---|
| G09G 5/10 | (2006.01) | |
| G09G 5/36 | (2006.01) | |
| G09G 3/34 | (2006.01) | |
| G06T 5/00 | (2006.01) | |
| H04N 19/625 | (2014.01) | |

(52) U.S. Cl.
CPC .............. *G09G 5/363* (2013.01); *G06T 5/009* (2013.01); *G09G 3/3413* (2013.01); *G09G 5/10* (2013.01); *H04N 19/625* (2014.11); *G09G 2320/0271* (2013.01); *G09G 2320/062* (2013.01); *G09G 2320/066* (2013.01); *G09G 2320/0613* (2013.01); *G09G 2320/0626* (2013.01); *G09G 2320/0693* (2013.01); *G09G 2360/144* (2013.01); *G09G 2360/16* (2013.01)

(58) Field of Classification Search
CPC .......................... G09G 2330/021; G09G 3/36
See application file for complete search history.

(56) References Cited

U.S. PATENT DOCUMENTS

| | | | |
|---|---|---|---|
| 7,302,110 B2 | 11/2007 | Chesnokov | |
| 2002/0109789 A1* | 8/2002 | Wakabayashi | G09G 1/002 348/678 |
| 2006/0244702 A1* | 11/2006 | Yamazaki | H01L 27/3269 345/89 |
| 2008/0074380 A1* | 3/2008 | Owyeung | G06F 3/04847 345/102 |
| 2008/0186262 A1* | 8/2008 | Lee | G09G 3/3225 345/82 |
| 2008/0186263 A1* | 8/2008 | Lee | G09G 3/3225 345/82 |
| 2008/0186264 A1* | 8/2008 | Lee | G09G 3/3233 345/82 |

(Continued)

FOREIGN PATENT DOCUMENTS

| | | |
|---|---|---|
| WO | 2006/072866 A1 | 7/2006 |
| WO | 2014/041193 A2 | 3/2014 |

*Primary Examiner* — Olga Merkoulova
(74) *Attorney, Agent, or Firm* — Gesmer Updegrove LLP

(57) ABSTRACT

In a method of enhancing the appearance of a digital image on an electronic display, Ambient Light Sensor (ALS) and Screen Brightness (SB) inputs are combined with a calibration input 12 to generate a first strength parameter 22, including an alpha component that is dependent only upon the properties of the display. Then a further, content-based input 24 is also combined to generate a second strength parameter 26, including a beta component that is dependent only upon a content type, or a content quality, or both.

22 Claims, 4 Drawing Sheets

(56) References Cited

U.S. PATENT DOCUMENTS

| | | | | |
|---|---|---|---|---|
| 2010/0118198 A1* | 5/2010 | Usui | ..................... | H04N 5/58 |
| | | | | 348/576 |
| 2014/0049527 A1* | 2/2014 | Lanzoni | ................ | G09G 3/36 |
| | | | | 345/207 |

* cited by examiner

METHOD AND APPARATUS FOR CONTROLLING A DISPLAY

PRIORITY INFORMATION

This invention claims priority to British Patent Application No. 1408358.8 filed in the British Patent Office on May 12, 2014.

The present invention relates to a method and an apparatus for controlling a display, and is concerned particularly with a method and an apparatus for enhancing the appearance of a digital image displayed on an electronic display in the presence of ambient light.

Because of the limited brightness of the screen and the reflection of ambient light from the surface(s) of the display, the appearance of a digital image may differ from its ideal appearance in the absence of ambient light. In particular, parts of the image that are relatively dark may become hidden by screen reflections. The degree to which an image with bright and dark parts becomes distorted by ambient light will depend on the brightness of the display and on the amount of ambient light. One previously considered method for reducing the distortion of image appearance caused by ambient light is to increase the brightness of the display in dependence on the ambient light. Additionally, the digital values of the image itself may be adjusted, in order to increase the actual brightness of part, or all, of the image.

It is known for the screen brightness (SB) to be adjusted automatically based on ambient light as measured by an ambient light sensor (ALS). Also, methods of improving the visibility of digital images on displays are known, whereby an image processing algorithm is controlled by the ALS. An example is described in WO 2006/072866.

In practice, the ALS values are filtered in time to avoid fast fluctuations in SB and image appearance, as described for example in WO 2014/041193. In such a system, the device incorporates an algorithm that converts the measured ALS value into one or more parameters that affect the strength of digital image processing. This may be via a mathematical formula or a look-up-table (LUT) that provides a value of such a "strength" parameter for a series of input values of ALS and interpolation between them.

A simple relationship is as follows:

$$\text{Strength}=F(\text{ALS})=\min(\text{strength\_max},\text{alpha}*\text{ALS}) \quad (1)$$

where alpha is a tuning parameter and strength_max is the maximum possible strength of the transform. Other relationships F between strength and ALS can be considered which may involve more than a single parameter and may be non-linear, in order to improve the overall appearance of the displayed image.

The strength parameter may be related to the gain applied to each pixel in the image, gain being defined such that a pixel value after image transformation equals the input pixel value multiplied by the gain value. In the simplest case, the gain can be a constant value, and output values that exceed the maximum digital value of the image (for example, R=255, G=255, B=255 in a standard 8-bit image) are clamped at their maximum values.

In the above example, gain is set equal to strength. The larger the value of alpha, the greater the gain that will be applied to the image as a function of ALS and therefore the brighter the image will appear as ambient light increases. Alpha is chosen in dependence on the display itself. The more reflective the display, the greater the value of alpha needed to preserve the visibility of dark pixels in the presence of screen reflections. An optimal value of alpha may be determined in order to minimize the perceived distortion of the image caused by the presence of ambient light.

Such a simple method typically gives poor image quality. Much better results are obtained by an adaptive space-variant algorithm such as is described in "ORMIT" U.S. Pat. No. 7,302,110. This gives better results because the gain in bright areas, which are most resilient to the effects of changes in ALS and SB, can be made near to unity, while the gain in dark areas, which are most affected by changes in ALS and SB, can be made much larger.

For an adaptive transform such as ORMIT, a corresponding value of strength can be defined, and related to the gain applied to pixels in the dark part of an image, as described in WO 2006/072866.

The value of screen brightness can also be used as an additional means of controlling strength, such that strength increases further if the screen brightness becomes reduced from its maximum value. In this case, the formula (1) is modified to include a term that depends on SB.

A limitation of the above method is that the value of strength for the ideal visual experience may differ from one type of content to another. For example, in the case of movie content compressed with low quality, it may be desirable to select a low strength value to avoid revealing compression artefacts, while in the case of a movie compressed with high quality it may be desirable to select a higher strength to reveal detail otherwise lost in shadow areas. In addition, it may be desirable to set another strength value for a graphical game, in order to reveal yet further shadow detail. As a result, an average value of strength must be chosen which is not optimal for any specific content type. It is therefore desirable to have a method which retains the ability to deliver a good visual experience when the type of content is unknown but which can deliver an optimal visual experience when the type of content is known.

The present invention is defined in the attached independent claims, to which reference should now be made. Further, preferred features may be found in the sub-claims appended thereto.

According to one aspect of the present invention, there is provided a method of enhancing the appearance of a digital image on an electronic display, the method comprising controlling an image transform process according to at least one condition of the display, and controlling the image transform process according to at least one characteristic of the image to be displayed.

Preferably the characteristic is determinable without analysis of the image data.

The method may comprise controlling the image transform process according to a condition of the display which condition comprises a sensed ambient light. Alternatively or in addition the method may comprise controlling the image transform process according to a screen brightness of the display.

The method preferably comprises controlling the image transform process in accordance with a characteristic of the image to be displayed, which characteristic comprises the image content type. The image content type may be any of the following, but not limited to: a game image, a digital photograph and a frame of a moving picture.

Alternatively or in addition the method may comprise controlling the image transform process in accordance with a characteristic of the image to be displayed, which characteristic comprises a quality-related parameter, such as but not limited to bit-rate or quantization parameter of the image to be displayed.

In a preferred arrangement the extent to which control must be performed according to a condition of the display is determined prior to determining the extent to which control must be performed according to a characteristic of the image to be displayed.

In a preferred arrangement, the method comprises calibrating the image transform process according to one or more properties of the display.

The method may comprise a method of enhancing an image comprising a still image. Alternatively or in addition, the method may comprise a method of enhancing an image comprising a moving image.

The method may comprise using an image transform process to adjust image data values from their original data values.

The image transform process may be fixed for all images. Alternatively the image transform process may be adaptive to the image. The image transform process may be adaptive differently to different regions of the image on the screen.

The method may include the step of specifying the amount of gain to be applied to the image data. Preferably the method comprises specifying a gain value to be applied to portions of an image corresponding to dark regions.

The invention also includes apparatus for enhancing the appearance of a digital image on an electronic display, the apparatus comprising an image transform process controlled according to at least one condition of the display, and according to at least one characteristic of the image to be displayed.

Preferably the characteristic is determinable without analysis of the image data.

The image transform process may be controlled according to a condition of the display which condition comprises a sensed ambient light. Alternatively or in addition the image transform process may be controlled according to a screen brightness of the display.

The image transform process may be controlled in accordance with a characteristic of the image to be displayed, which characteristic comprises the image content type. The image content type may be any of the following, but not limited to: a game image, a digital photograph, a frame of a moving picture, and a graphical user interface.

Alternatively or in addition the image transform process may be controlled in accordance with a characteristic of the image to be displayed, which characteristic comprises a quality-related parameter, such as but not limited to bit-rate or quantization parameter of the image to be displayed.

In a preferred arrangement the extent to which control must be performed according to a condition of the display is determined prior to determining the extent to which control must be performed according to a characteristic of the image to be displayed.

In a preferred arrangement, the image transform process may be arranged to be calibrated according to one or more properties of the display.

The image transform process may be arranged in use to adjust image data values from their original data values.

The image transform process may be arranged to adjust image data in a manner that is fixed for all images. Alternatively the image transform process may be adaptive to the image. The image transform process may be adaptive differently to different regions of the image on the careen.

The invention also comprises a program for causing a device to perform a method of enhancing the appearance of a digital image on an electronic display, the method comprising controlling an image transform process according to at least one condition of the display, and controlling the image transform process according to at least one characteristic of the image to be displayed.

The invention also comprises a computer program product, storing, carrying or transmitting thereon or therethrough a program for causing a device to perform a method of enhancing the appearance of a digital image on an electronic display, the method comprising controlling an image transform process according to at least one condition of the display, and controlling the image transform process according to at least one characteristic of the image to be displayed.

The invention may include any combination of the features or limitations referred to herein, except such a combination of features as are mutually exclusive, or mutually inconsistent.

A preferred embodiment of the present invention will now be described. By way of example only, with reference to the accompanying diagrammatic drawings, in which.

Figure 1:
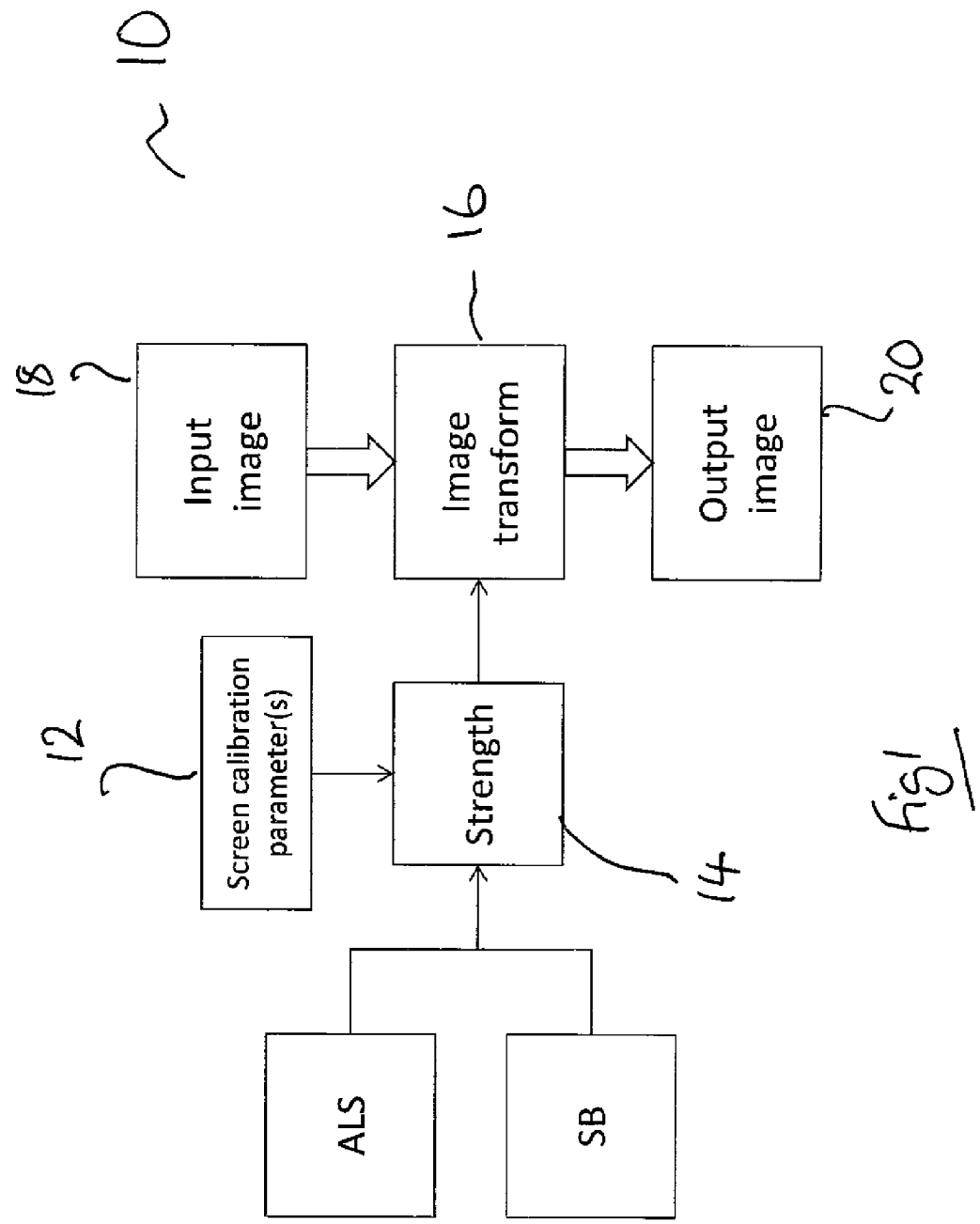
FIG. 1 shows schematically a previously considered method for controlling an image transform engine.

The key part of the invention relates to the modification of the strength parameter of Equation 1 in dependence on a characteristic of the image being displayed.

It is usually found that the most optimal value of strength at given ALS and SB values depends on the type of image being displayed. For example, the most desirable value of strength may be greatest for a graphical image, such as a frame of an immersive game, may be lesser for a digital photograph, and may be lesser still for the frame of a movie. And for a movie, the optimal value of strength may depend on the compression quality of the movie, because increasing strength increases the visibility of compression artefacts, which is undesirable. Therefore a movie encoded with high quality may be optimally displayed using a strength parameter greater than that of the same movie encoded with low quality.

Therefore it is desirable to have a method whereby the value of strength obtained automatically by Equation (1) or a generalization thereof, which does not depend on the type or quality of the image content itself, can be further modified based on the properties of the specific type of image content being displayed at a particular time. Note that by "type of content" it is not implied that the parameter should be varied based on the specific image, but rather the type of image (movie frame, game, photograph, user interface for example).

To achieve this, the following scheme is provided:

The device is calibrated at time of production with an alpha parameter setting based on an average over all kinds of content which will be displayed on the device A software application may offset this value based on the type or quality of content being displayed.

In other words, we replace Equation (1) by:

$$\text{Strength} = \min(\text{strength\_max}, \text{beta} \ast \text{alpha} \ast \text{ALS}) \quad (2)$$

where alpha is dependent only on the display properties and beta is dependent only the type or quality of content.

It is important to note that the parameter alpha is tuned to compensate for variations in the display properties, primarily its reflectivity. This reduces variation in distortion of the displayed image between different kinds of displays. Therefore the beta parameter can be tuned purely based on the type of content, and independent of the display itself. This is practically very important since it would not be practical for a software application, which must run on many different types of devices, to have to select a tuning parameter that depends on each individual device type.

Thus the alpha parameter is tuned one time as a one-off factory calibration, whereas the beta parameter is tuned at the time the specific content is displayed.

Different values of beta may be chosen for different types of content. For example, a graphical game may select a value of beta=2, meaning that shadow detail is twice as bright as it would be for standard content, at each given ALS value.

For movies, beta may be chosen in dependence of the quality of the content since, as mentioned above, the primary factor affecting the quality of the enhanced image is the amount of compression artefacts that are present.

For example, beta_movie=G(bitrate) or, better: beta_movie=G(1/QP) where QP is the well-known quantization parameter that affects the amount of spatial detail which is preserved by the compression algorithm. In a simple example, G=gamma* (i.e. multiply by a further tuning parameter gamma).

Typically, the alpha parameter will be set by the device OS via the display driver, while the beta parameter will be set by the application which delivers the particular image content.

Turning to FIG. 1, this shows schematically, generally at 10, a previously considered method of controlling an image transform engine in which ambient light sensor (ALS) and screen brightness (SB) inputs are combined with a screen calibration parameter 12 to determine a strength parameter 14 for controlling the image transform 16. The image transform converts input image data 18 to output image data 20 accordingly.

Figure 2:
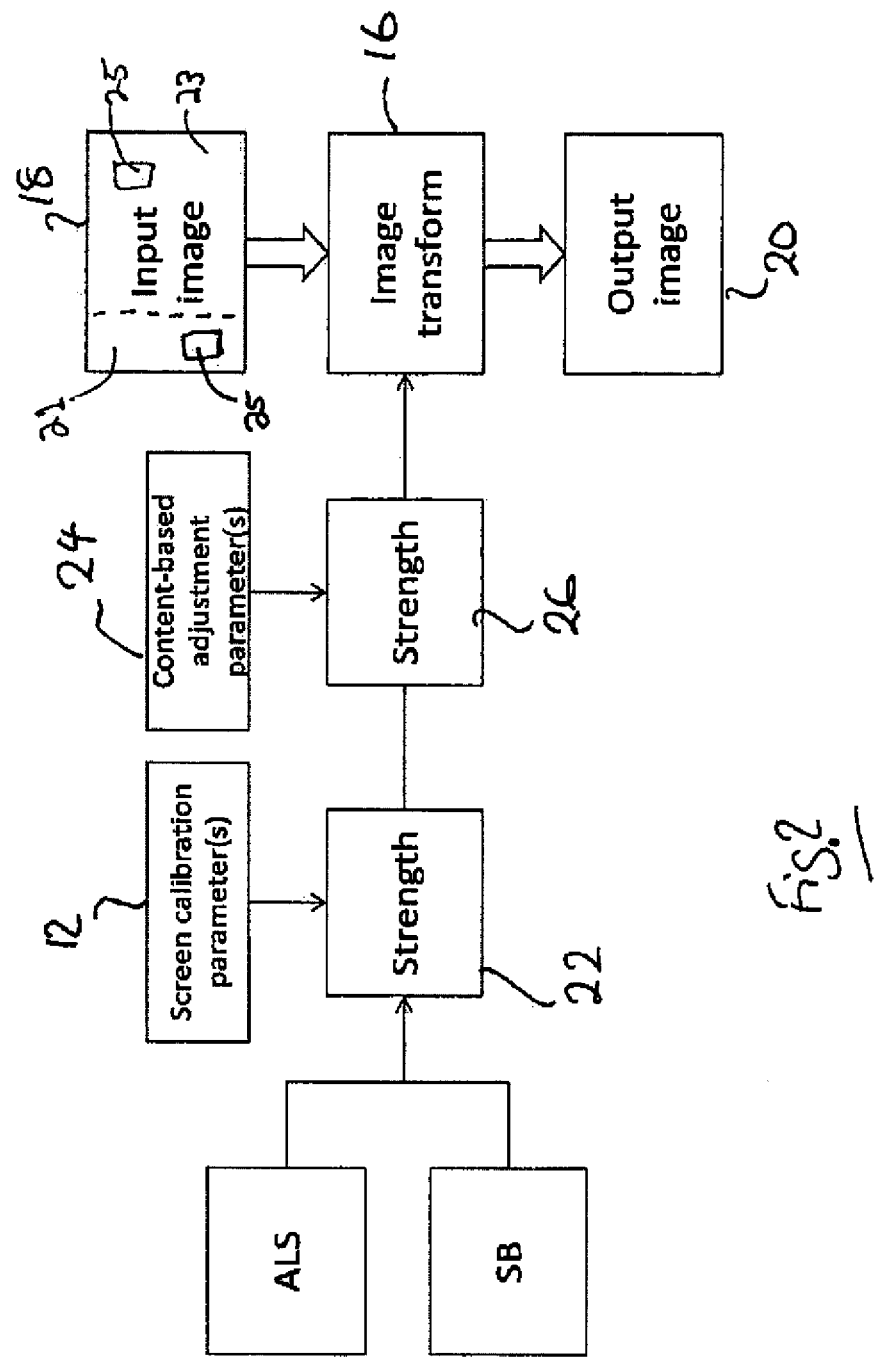
FIG. 2 shows schematically a method of controlling an image transform engine according to an embodiment of the present invention.

FIG. 2 illustrates schematically a method according to an embodiment of the present invention. ALS and SB inputs are combined with a calibration input 12 as before to generate a first strength parameter 22, including an alpha component that is dependent only upon the properties of the display. Then a further, content-based input 24 is also combined to generate a second strength parameter 26, including a beta component that is dependent only upon a content type, or a content quality, or both.

The image transform 16 again converts the input image data 18 to output image data 20, but now the output image data 20 is optimised for the ambient light, the screen brightness, the characteristics of the particular display and the content of the image.

Figure 3:
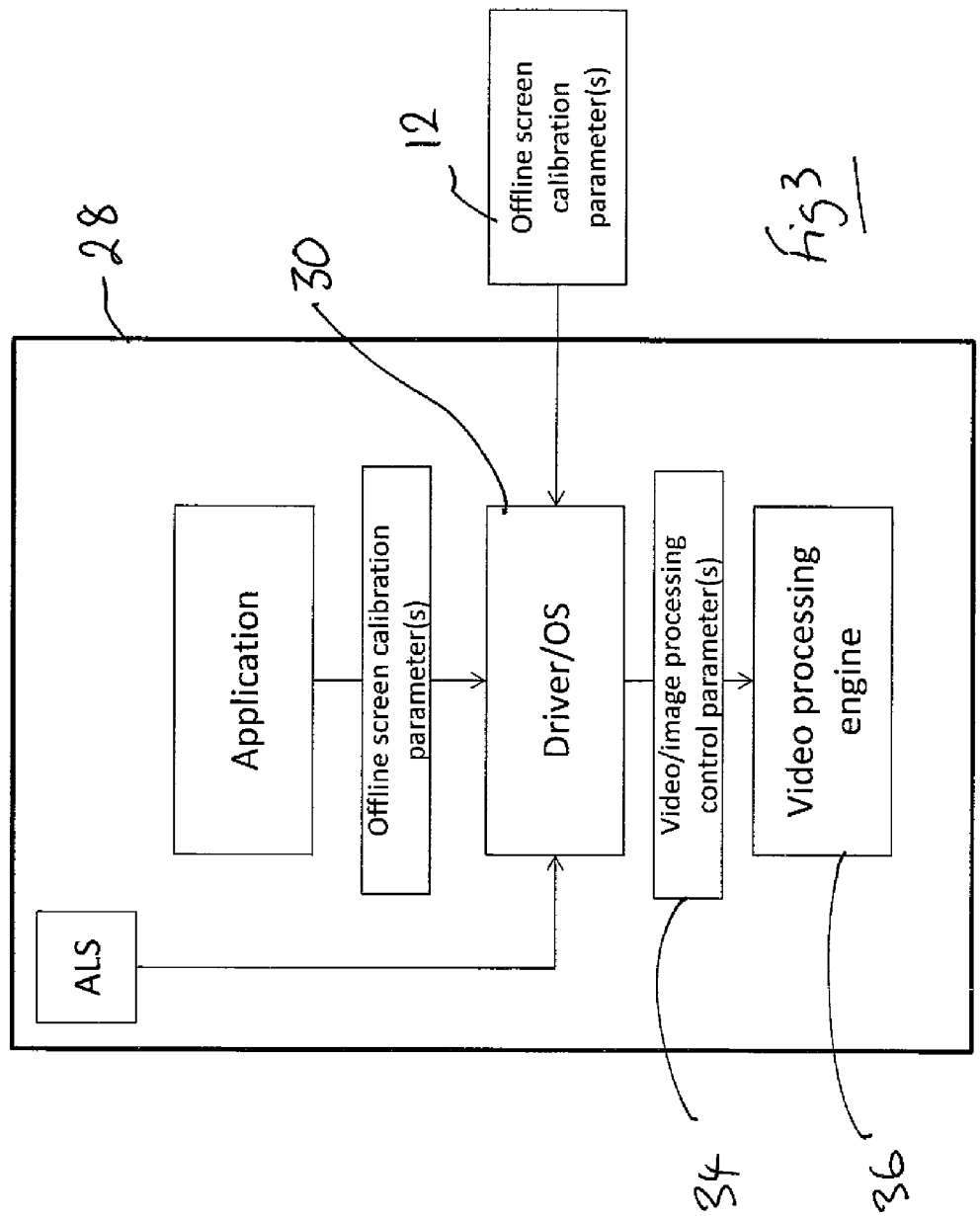
FIG. 3 shows schematically an implementation of the method depicted in FIG. 2.

FIG. 3 illustrates schematically an implementation of the scheme of FIG. 2, in this case on a smartphone 28. The ambient light sensor inputs to the operating system 30 which controls a display driver. One or more calibration parameters 12 are also input to the operating system offline. An application 32 delivers image content and also provides one or more content-relevant parameters 34 for further control of the image data transform process. The operating system, via the display driver, then provides a combined image processing parameter 34 to a video processing engine 36.

Figure 4:
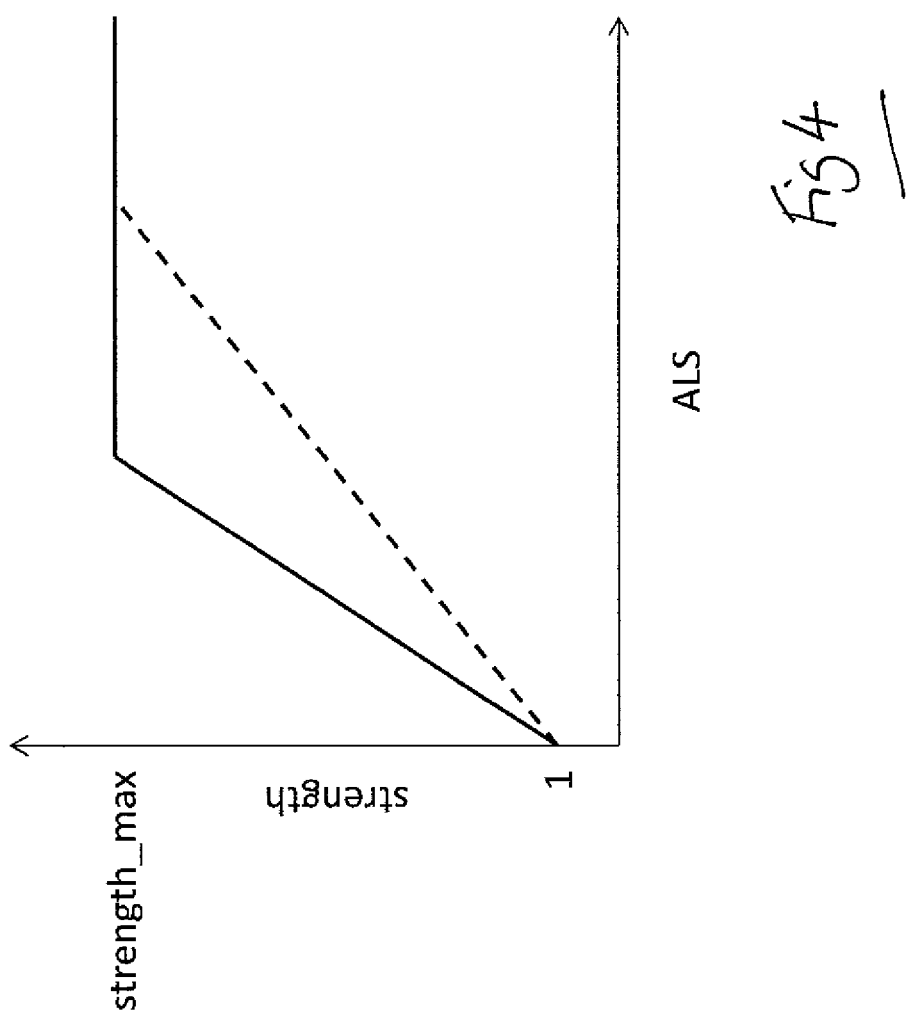
FIG. 4 is a graph showing strength of image transform as a function of ALS for different values of a parameter beta.

Turning to FIG. 4, this illustrates graphically a strength parameter strength_max (y-axis) as a function of ambient light sensed (ALS) (x-axis). The broken line represents a content-based adjustment parameter beta, where beta=1, corresponding to an unknown imagery. The solid line represents a beta value of 2, corresponding to a high-quality movie or game imagery.

In accordance with embodiments of the invention, an image transform is used to process an image or video to be displayed. The transform is controlled in accordance with a parameter or set of parameters dependent on the properties of the display and also in accordance with another parameter or parameters dependent on the properties or characteristics of the type of image or video to be displayed.

The characteristic of the image is not readily determined by analysis of the pixels, but is something that is delivered additionally to the image data. An example would be that the image data is labelled as a photograph. Therefore the image transform is adapted to the image in two separate ways; the overall strength of the transform, which controls the maximum gain that can be applied to the darkest parts of any image, is determined according to the image type, while the actual gain applied to an individual pixel of a specific image may be determined adaptively based on a statistical analysis of the image histogram for example.

An image transform engine is used to adjust image data values from their original values. The transform engine is controlled based on the ambient light or the screen brightness or both. The control method is calibrated based on the properties or characteristics of the display and is further modified based on the properties of the image being displayed The image transform may be a fixed transform for all images or may be adaptive to the original image. In particular, the image transform may be adaptive differently to different regions 21, 23 of an image. When the image transform engine is adaptive to the image, the control method may consist of specifying the amount of gain to be applied to portions 25 of an image which correspond to relatively dark regions as displayed.

The type of content can be determined, for example, from the file type (e.g. JPEG) or via an application running on the device which has a priori knowledge about the type of content which is being rendered locally on the device or which is been downloaded or streamed from a remote server.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A method of enhancing an appearance of a digital image on an electronic display, the method comprising controlling an image transform process according to at least one condition of the display, and controlling the image transform process according to at least one characteristic of an input image to be displayed, which characteristic comprises a quality-related parameter of the input image to be displayed, wherein the image transform process:
   (a) operates to adjust image data values of an input image to be displayed in accordance with a strength parameter; and
   (b) controlling the image transform process according to the quality-related parameter of the input image to be displayed includes modifying the strength parameter that is used for the image transform process for the input image to be displayed according to the at least one characteristic of the input image to be displayed, which characteristic comprises the quality-related parameter of the input image to be displayed; wherein:

(c) the quality-related parameter includes at least one of a bit-rate of the input image to be displayed and a quantization parameter of the input image to be displayed.

2. A method according to claim 1, wherein controlling the image transform process according to at least one condition of the display includes controlling the image transform process according to a sensed ambient light.

3. A method according to claim 1, wherein controlling the image transform process according to at least one condition of the display includes controlling the image transform process according to a screen brightness of the display.

4. A method according to claim 1, further comprising controlling the image transform process in accordance with an image content type of the input image to be displayed.

5. A method according to claim 4, wherein the image content type comprises any of the following: a game image, a digital photograph, a frame of a moving picture and a graphical user interface.

6. A method according to claim 1, wherein an extent to which control must be performed according to a condition of the display is determined prior to determining the extent to which control must be performed according to a characteristic of the input image to be displayed.

7. A method according to claim 1, comprising calibrating the image transform process according to one or more properties of the display.

8. A method according to claim 1, wherein the same image transform process is used for all images to be displayed.

9. A method according to claim 1, wherein the image transform process is adaptive to the image.

10. A method according to claim 9, wherein the image transform process is adaptive differently to different regions of the input image on a screen of the display.

11. A method according to claim 1, comprising specifying a gain value to be applied to portions of the input image to be displayed corresponding to dark regions of the input image to be displayed.

12. Apparatus for enhancing an appearance of a digital image to be displayed when displayed on an electronic display, the apparatus comprising a video processing engine that includes an image transform engine that performs an image transform process controlled according to at least one condition of the display, and according to at least one characteristic of an input image to be displayed, which characteristic includes a quality-related parameter of the input image to be displayed; wherein the quality-related parameter includes at least one of a bit-rate of the input image to be displayed and a quantization parameter of the input image to be displayed.

13. Apparatus according to claim 12, wherein controlling the image transform process according to a condition of the display comprises controlling the image transform process according to a sensed ambient light.

14. Apparatus according to claim 12, wherein controlling the image transform process according to a condition of the display comprises controlling the image transform process according to a screen brightness of the display.

15. Apparatus according to claim 12, wherein the image transform process is further controlled in accordance with an image content type of the input image to be displayed.

16. Apparatus according to claim 15, wherein the image content type may be any of the following: a game image, a digital photograph, a frame of a moving picture and a graphical user interface.

17. Apparatus according to claim 12, wherein an extent to which control must be performed according to a condition of the display is determined prior to determining the extent to which control must be performed according to a characteristic of the input, image to be displayed.

18. Apparatus according to claim 12, wherein the image transform process is arranged to be calibrated according to one or more properties of the display.

19. Apparatus according to claim 12, wherein the image transform process is arranged in use to adjust image data values.

20. Apparatus according to claim 12, wherein the image transform process is arranged to adjust image data in the same manner for all images to be displayed.

21. Apparatus according to claim 12, wherein the image transform process is adaptive differently to different regions of the input image on a screen of the display.

22. A non-transitory computer program product storing a program for causing a device to perform a method of enhancing an appearance of a digital image to be displayed on an electronic display, the method comprising controlling an image transform process according to at least one condition of the display, and controlling the image transform process according to at least one characteristic of an input image to be displayed, which characteristic includes a quality-related parameter of the input image to be displayed wherein:

the quality-related parameter includes at least one of a bit-rate of the input image to be displayed and a quantization parameter of the input image to be displayed.

* * * * *